US007767616B2

(12) United States Patent
Liu et al.

(10) Patent No.: US 7,767,616 B2
(45) Date of Patent: Aug. 3, 2010

(54) ALIGNED CARBON NANOTUBE WITH ELECTRO-CATALYTIC ACTIVITY FOR OXYGEN REDUCTION REACTION

(75) Inventors: Di-Jia Liu, Naperville, IL (US); Junbing Yang, Westmont, IL (US); Xiaoping Wang, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 669 days.

(21) Appl. No.: 11/368,120

(22) Filed: Mar. 3, 2006

(65) Prior Publication Data

US 2010/0167918 A1     Jul. 1, 2010

Related U.S. Application Data

(60) Provisional application No. 60/692,773, filed on Jun. 21, 2005, provisional application No. 60/684,864, filed on May 26, 2005.

(51) Int. Cl.
| | |
|---|---|
| B01J 21/18 | (2006.01) |
| B01J 23/00 | (2006.01) |
| B01J 23/40 | (2006.01) |
| B01J 23/74 | (2006.01) |
| D01C 5/00 | (2006.01) |
| D01F 9/12 | (2006.01) |

(52) U.S. Cl. ................ 502/185; 502/180; 502/182; 423/447.3; 423/447.5; 977/742; 977/743; 977/744; 977/748; 977/749; 977/750; 977/752; 977/810

(58) Field of Classification Search ............. 502/180, 502/182, 185; 423/447.3, 447.5; 977/742–744, 977/748, 749, 750, 752, 810
See application file for complete search history.

(56) References Cited

U.S. PATENT DOCUMENTS 5,330,860 A   7/1994  Grot et al.
5,399,184 A   3/1995  Harada
5,521,018 A   5/1996  Wilkinson et al.

(Continued)

FOREIGN PATENT DOCUMENTS

WO       WO 00/17102       *  3/2000

OTHER PUBLICATIONS

"Growth of Vertically Aligned Nitrogen-Doped Carbon Nanotubes: Control of the Nitrogen Content over the Temperature Range 900-1100°C," Yun Tack Lee et al. J. Phys. Chem. B 2003, 107, pp. 12958-12963.*

(Continued)

*Primary Examiner*—Patricia L Hailey
(74) *Attorney, Agent, or Firm*—Olson & Cepuritis, Ltd.

(57) ABSTRACT

A catalyst for an electro-chemical oxygen reduction reaction (ORR) of a bundle of longitudinally aligned carbon nanotubes having a catalytically active transition metal incorporated longitudinally in said nanotubes. A method of making an electro-chemical catalyst for an oxygen reduction reaction (ORR) having a bundle of longitudinally aligned carbon nanotubes with a catalytically active transition metal incorporated throughout the nanotubes, where a substrate is in a first reaction zone, and a combination selected from one or more of a hydrocarbon and an organometallic compound containing an catalytically active transition metal and a nitrogen containing compound and an inert gas and a reducing gas is introduced into the first reaction zone which is maintained at a first reaction temperature for a time sufficient to vaporize material therein. The vaporized material is then introduced to a second reaction zone maintained at a second reaction temperature for a time sufficient to grow longitudinally aligned carbon nanotubes over the substrate with a catalytically active transition metal incorporated throughout the nanotubes.

17 Claims, 10 Drawing Sheets

U.S. PATENT DOCUMENTS

| | | | | |
|---|---|---|---|---|
| 6,090,363 | A * | 7/2000 | Green et al. | 423/447.1 |
| 6,129,901 | A * | 10/2000 | Moskovits et al. | 423/447.3 |
| 6,159,892 | A * | 12/2000 | Moy et al. | 502/174 |
| 6,706,431 | B2 * | 3/2004 | Kawamura et al. | 429/13 |
| 6,835,330 | B2 * | 12/2004 | Nishino et al. | 252/503 |
| 6,861,387 | B2 * | 3/2005 | Ruth et al. | 502/184 |
| 6,863,942 | B2 * | 3/2005 | Ren et al. | 428/36.9 |
| 6,967,013 | B2 * | 11/2005 | Someya et al. | 423/447.3 |
| 7,011,771 | B2 * | 3/2006 | Gao et al. | 252/502 |
| 7,022,642 | B2 * | 4/2006 | Yamamoto | 502/185 |
| 7,105,246 | B2 * | 9/2006 | Suzuki et al. | 429/40 |
| 7,288,321 | B2 * | 10/2007 | Liu et al. | 428/408 |
| 7,288,502 | B2 * | 10/2007 | Okanobori et al. | 502/185 |
| 2004/0018416 | A1 * | 1/2004 | Choi et al. | 429/44 |
| 2004/0197638 | A1 | 10/2004 | McElrath et al. | |
| 2004/0224217 | A1 | 11/2004 | Toops | |
| 2006/0024378 | A1 * | 2/2006 | Mehta | 424/489 |

OTHER PUBLICATIONS

R. Jasinski, A New Fuel Cell Cathode Catalyst, Nature vol. 201, (1964) 1212-1213.

J.A.R. Van Veen et al., Oxygen Reduction on Monomeric Transition Metal Phthalocyanines in Acid Electrolyte, Electrochim. Acta vol. 24, (1979) pp. 921-928.

Lefevre M. et al., Fe-based Catalysts for the Reduction of Oxygen in Polymer Electrolyte Membrane Fuel Cell Conditions: . . . Electrochim. Acta vol. 48 (2003) 2749-2760.

Faubert, G, Activation and Characterization of Fe-based Catalysts for the Reduction of Oxygen in Polymer Electrolyte . . . , Electrochim Acta vol. 43, (1998) Nos. 14-15 1969-1984.

Wilson et al., Thin Film Catalyst Layers for Polymer Electrolyte Fuel Cell Electrodes, Journal of Applied Electrochemistry 22 (1992) pp. 1-7.

Tang H. et al., High Dispersion and Electrocatalytic Properties of Platinum on Well-Aligned Carbon Nanotube Arrays, Carbon 42 (2004) 191-197.

* cited by examiner

+

+
$NH_3$

ALIGNED CARBON NANOTUBE WITH ELECTRO-CATALYTIC ACTIVITY FOR OXYGEN REDUCTION REACTION

This application claims the benefit of Provisional Application Ser. No. 60/692,773 filed Jun. 21, 2005.

FIELD OF THE INVENTION

This invention relates to the preparation of aligned carbon nanotubes with transition metal catalyst sites longitudinally spaced therealong and is related to Provisional Application Ser. No. 60/684,864 filed May 26, 2005, to which the non-provisional application Ser. No. 11/368,116 was filed on Mar. 3, 2006, the entire disclosure thereof being incorporated by reference.

The United States Government has rights in this invention pursuant to Contract No. W-31-109-ENG-38 between the U.S. Department of Energy (DOE) and The University of Chicago representing Argonne National Laboratory.

BACKGROUND INFORMATION

A fuel cell is an effective device that can convert chemical energy to electric energy through electro-catalytic reactions. The proton exchange membrane fuel cell (PEMFC) operates at a relatively low temperature with gas phase hydrogen as fuel and oxygen (air) as oxidant. Due to its high energy conversion efficiency, low noise and low chemical emissions, the PEMFC demonstrates high potential in automobile and distributed power generation.

At the core of a PEMFC is the membrane electrode assembly (MEA) which consists of an anode, a cathode and a polymer electrolyte layer in between. At the surface of the anode, a hydrogen molecule is oxidized to two protons through the electro-catalytic process:

$$H_2 \rightarrow 2H^+ + 2e^- \quad (1)$$

The protons thus produced are transported to the cathode through the proton conductive membrane. At the surface of the cathode, oxygen is electro-catalytically reduced and subsequently reacts with protons from the equation (1) to form water, as follows:

$$O_2 + 4e^- + 4H^+ \rightarrow 2H_2O \quad (2)$$

Reaction (2) is also known as the oxygen reduction reaction (ORR). Reactions (1) and (2) occur on the surface of the electrode catalysts. At present, the most effective catalyst for these reactions are made of platinum supported on an amorphous carbon. A typical Pt weight loading on the catalyst support ranges from 15% to 40%. Since platinum is a precious metal with limited supply, its usage adds a significant cost to a PEMFC system. Furthermore, the current method of preparing a MEA is very ineffective in utilizing platinum. An ink containing Pt/carbon catalyst mixed with a polymer solution (ionomer) is cast on the surface of the membrane, followed by hot pressing. Such a method often buries Pt/carbon catalyst particles underneath the ionomer matrix rendering them inaccessible to hydrogen or oxygen and unavailable to participate the aforementioned reactions. Fully utilizing the active catalyst is very important in reducing cost, especially for the cathode application since ORR is a more sluggish reaction than hydrogen oxidation, thus often requiring more catalyst. For example, the amount of platinum used at the PEMFC cathode typically is around 0.4 mg/cm$^2$ whereas that used at anode is about 0.14 mg/cm$^2$.

There are numerous methods existing in preparing conventional noble metal based electrode catalysts for fuel cell application. A brief summary was provided by Wilson and Gottesfeld as disclosed in the Journal Of Applied Electrochemistry 22, Wilson and Gottesfeld, the disclosure of which is incorporated herein. The inventive method is superior than the prior art because a) ACNTs according to the invention has good electro-catalytic activity yet does not have to contain noble metal; b) ACNTs according to the invention have unique shapes, orientation and spatial patterns for alignment and bundling that are not possible by the conventional electrode catalyst materials.

Dodelet and coworkers as disclosed in Electrochim Acta 48, M. Lefevre et al. and Electrochim Acta 43, G. Faubert et al., the disclosures of which are incorporated herein by reference, have published a series of studies on preparing noble metal free electro-catalyst for ORR using the macromolecules containing a functional group with transition metal coordinated by four pyrrolyl nitrogens, MN$_4$.

The catalysts were fabricated by mixing or impregnating a macromolecule with MN$_4$ group such as Fe porphyrin or FePc over a carbon precursor or carbonaceous materials, followed by high temperature treatment in hydrogen, argon and ammonia gas. The powder materials after high temperature treatment were collected as electrode catalysts. The subject invention is fundamentally different from the prior art based on the following key differences; a) the inventive catalysts are prepared through CVD process, i.e. the precursor is first vaporized then re-deposited to form over a substrate. Therefore, the inventive method provides better mixing of organometallics and hydrocarbons and wider metal-to-carbon ratios than that of the prior art, b) ACNTs produced according to the subject invention has a graphitic structure with ORR catalytic active sites embedded longitudinally in the surface of ACNTs, providing better stability in acidic and oxidative environments than the catalyst from the prior art where carbon is in the amorphous form and is unstable under these conditions, c) ACNTs produced according to the subject invention has unique tubular shape with identical spatial alignments. The amorphous powder of the prior art do not have such properties.

H. Tang et. al. discussed a method of dispersion platinum over aligned carbon nanotubes to generate electrocatalytic properties, H. Tang et al., Carbon 42 (2004) 191, the disclosure of which is incorporated herein. The instant invention is superior to this method since the inventive catalyst does not have to contain costly noble metals such as platinum.

SUMMARY OF THE INVENTION

This invention relates to a new method of preparing the electrode catalyst as well as the catalyst prepared thereby for the oxygen reduction reaction (ORR) that contains mainly transition metal, carbon and nitrogen but little or no noble metal. The new catalysts also have unique geometric structures of hollow carbon nanotube bundles aligned with the same spatial orientation. These aligned carbon nanotubes (ACNT) are prepared through a chemical vapor deposition (CVD) method using precursors made of hydrocarbons, optionally nitrogen containing hydrocarbons and the organometallic compounds containing transition metal ions, preferably such as Fe and Co by also including Ni, Cr and Mn. Representative organometallic compounds and hydrocarbon compounds may also be used in the invention (as nonlimited examples appear in Table 1.

TABLE 1

1. Phthalocyanine iron(II); $C_{32}H_{16}FeN_8$

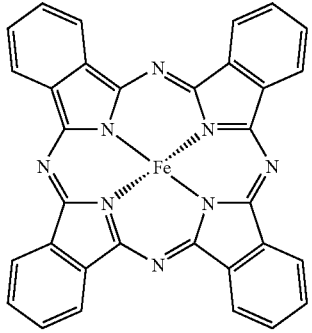

2. Ferrocene $C_{10}H_{10}Fe$

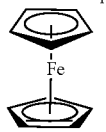

3. Bis(cyclopentadienyl)cobalt(II) $C_{10}H_{10}Co$

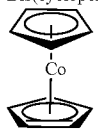

4. Cobalt(II) phthalocyanine $C_{32}H_{16}CoN_8$

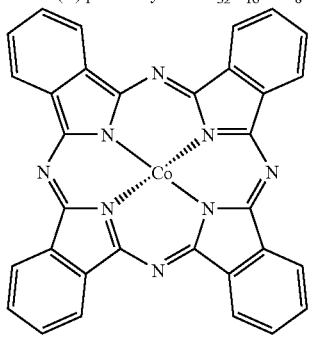

5. 5,10,15,20-Tetrakis(pentafluorophenyl)porphyrin iron(III) chloride $C_{44}H_8ClF_{20}FeN_4$

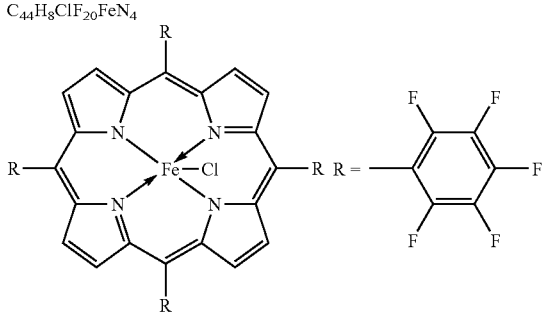

6. Iron pentacarbonyl $Fe(CO)_5$
7. dicobalt octacarbonyl $Co_2(CO)_8$
8. Xylene $C_8H_{10}$

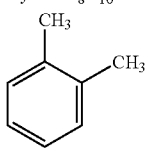

TABLE 1-continued

9. Toluene $C_6H_5CH_3$

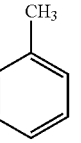

10. Benzene $C_6H_6$

11. Pyridine $C_5H_5N$

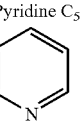

12. Acetonitrile $CH_3CN$
13. Acetylene $C_2H_2$
14. Ethylene $C_2H_4$

The ACNTs grow over a substrate with a polished surface that are stable under elevated temperature such as a quartz plate. Other substrate materials such as fused silica, single and polycrystalline silicon and metals stable under high temperature can also be used. ACNT growth with CVD, preferably, is in the presence of a carrier gas mixture containing hydrogen as a reducing agent, ammonia as a nitrogen source, if needed, and an inert gas such as argon. The geometry and the alignment are accomplished by controlling vaporization and decomposition conditions without the need of any template such as that used in the case of an anodized aluminum oxide layer. A portion of transitional metal from the organometallics is transferred and embedded into the surface of the ACNT and forms functional groups with carbon and nitrogen during nanotube growth. The ACNT containing such functional groups can interact with $O_2$ to facilitate ORR electrocatalytically. Therefore, they can be used as low cost alternatives to the Pt/C based cathode catalyst currently used as a benchmark. Furthermore, ACNT bundles can also be fabricated with different geometric patterns to facilitate the interaction between nanotube and the fuel gas in a PEMFC. The patterned ACNT bundles can be transferred from the substrate onto the polymer electrolyte membrane with the geometrical orientation intact.

Therefore, they can be used to prepare a MEA with the electro-catalyst layer in a completely different geometry and physical property from that of the prior art.

An object of the current invention is to prepare densely populated, spatially oriented aligned carbon nanotubes using a two-zone chemical vapor deposition reactor. The first zone operates at a lower temperature where the organometallic precursors or the hydrocarbon and organometallic precursor mixtures are vaporized and mixed in the gas phase with the carrier gas mixture. The second zone operates at a higher temperature where the hydrocarbon and organometallic precursors decompose over a polished substrate. ACNTs grow perpendicular to the substrate under the controlled temperature, flow rate and carrier gases. A three-dimensional ACNT pattern can also be formed if the substrate has been previously prepared with the 3-D surface through well known chemical methods such as photolithography and/or acid etching or other physical methods such as engraving.

Another object of the current invention is to prepare ACNTs with catalytic activity for an oxygen reduction reaction (ORR) for a fuel cell and other related electro-chemical applications.

A further object of the invention is to prepare ACNTs with ORR catalytic activity by directly vaporizing organometallic compounds containing Fe or Co and other transition metal ions coordinated with four pyrrole nuclei in a porphyrin like ring structure. Such compounds include iron phthalocyanine, iron porphyrin, bis(cyclopentadienyl)cobalt, cobalt porphyrin, etc. The vaporization is performed in Zone I and the ACNTs grow in Zone II in the presence of gases such as hydrogen and argon and optionally ammonia. The ACNTs thus formed have transition metal atomically distributed throughout the graphitic substrate, which has the electro-catalytic activity towards ORR.

Yet another object of the invention is to prepare ACNTs with significantly enhanced ORR catalytic activity and stability in an acidic environment such as that used in PEMFC by adding ammonia into the carrier gas mixture during a CVD process.

Another object of the invention is to prepare ACNTs with different geometric shapes and dimensions. The nanotubes can be straight or spiral with the inside being fully open or having a "bamboo"-like structure with intermediate nodes. The tube diameters range from 10 to 100 nanometers (nm) and the length ranges from 0.5 to 50 μm.

A further object of the invention is to prepare ACNTs over a substrate with pre-formed three-dimensional patterns simulating the flow-field on the face of bipolar plates in a PEMFC for gas feed and humidity management.

A further object of the invention is to provide a MEA containing ACNTs as the electrode catalyst layer on the cathode side. ACNTs have, in this embodiment, an orientation perpendicular to the electrolyte membrane and have the catalytic activity for an oxygen reduction reaction with or without a three-dimensional pattern arrangement with improved gas transfer and humidity management.

A further object of the invention is to provide a MEA containing ACNTs as the support for electrode catalyst on one or more of the cathode and anode side. ACNTs have, in this embodiment, an orientation perpendicular to the electrolyte membrane and have the catalytic activity for an oxygen reduction reaction with or without a three-dimensional pattern arrangement with improved gas transfer and humidity management.

A final object of the invention is to provide a membrane electrode assembly comprising an anode and a cathode and a proton-conducting electrolyte layer therebetween, bundles of aligned carbon nanotubes having catalytically active transition metal incorporated longitudinally in the nanotubes with or without associated nitrogen in contact with one or more of the anode and cathode and electrolyte layer and being positioned such that the bundles are generally perpendicular to the electrolyte layer.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
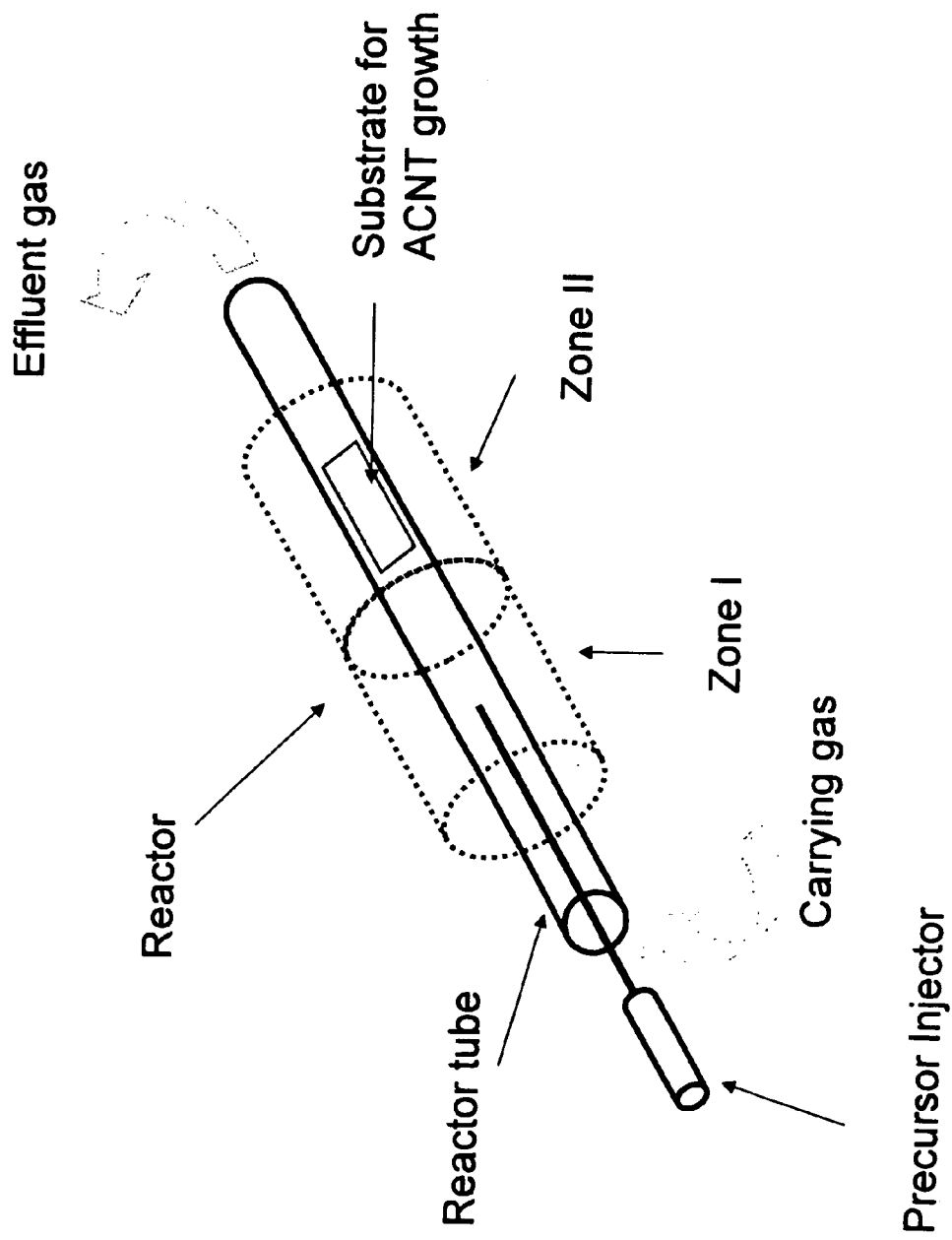
FIG. 1 is a schematic representation of a carbon vapor deposition reactor useful in the present invention showing the two zone configuration and placement for the aligned carbon nanotube (ACNT) growth.

The invention hereinafter described in detail makes use of catalytically active transition metals, that is transition metals that are catalytically reactive for an oxygen reduction reaction presently carried out by noble metals such as platinum or catalytically active platinum group metals. A principal object of the invention is to provide a low-cost substitute for platinum or other commonly used catalysts which are expensive. It is within the scope of this invention to incorporate some presently known expensive material in the catalyst at reduced level prepared disclosed herein in order to improve the efficiencies thereof.

Although a variety of metals may be catalytically active within the meaning of this invention, those preferred are iron, cobalt, nickel, manganese, chromium and mixtures and alloys thereof. More preferred are iron, cobalt, nickel and mixtures and alloys thereof and most preferred is iron and cobalt their alloys and mixtures with other materials. The hereinafter invention has produced aligned carbon nanotubes which are graphitic, a substantial improvement over the prior art amorphous carbon presently available and include the transition metal distributed along the entire length of the nanotube. The nanotube may have the transition metal, per se, distributed along the length thereof or may have a chemical compound of the transition metal and nitrogen distributed along the length thereof, it being preferred that nitrogen be present, although not required. The catalyst of the present invention has great utility in fuel cells having both cathodes and anodes and an electrolyte and is particularly useful in a PEMFC wherein the membrane is permeable to hydrogen ions, all as well known in the art. In general, the aligned graphitic nanotubes may be either straight or spiral or bamboo-like or bellows-like in shape and by bamboo as used herein, it refers to graphitic nanotubes which have intermittent variation of transverse portions with the closure inside along the longitudinal axis thereof, and bellows-like as used herein refers to graphitic nanotubes which have intermittent variations in diameter with the inside open along the longitudinal axis thereof. The inventive graphitic nanotubes have been prepared with average diameters in the range of from about 10 to about 100 nanometers (nms) and having average length in the range of from about 0.5 to about 50 micrometers (μm).

As before stated, it is preferred that nitrogen is chemically bonded to the transition metal which is placed longitudinally of the nanotube. The nitrogen may be introduced either in a form of a nitrogen-containing transition metal organometallic compound or by having a nitrogen containing compound such as ammonia present during the reaction. Generally, the method disclosed hereinafter includes providing an input mixture in a lower temperature reaction zone in a chemical vapor deposition reactor containing one or more of a hydrocarbon, an organometallic compound containing a catalytically active transition metal and a nitrogen containing compound along with an inert gas and a reducing gas. After the mixture is fully vaporized, the gas vapor mixture is introduced into a second reaction zone which is maintained at a higher temperature with the placement of a substrate for growth of the ACNT. The ACNT may be grown on a variety of substrates including a transition metal or single or polycrystal silicon or a silicon containing compound such as quartz or silica. The temperature in the first zone is generally maintained between 150° C. and about 700° C. while the temperature in the second zone is generally maintained in the range of from about 700° C. to about 1000° C. The period of time for nanotube growth is preferably in the range of from about 10 to about 45 minutes.

Cathodic oxygen reduction reaction, such as that described by Equation 2, typically occurs at the surface of platinum in the electro-catalyst. Molecular oxygen is first adsorbed on the Pt active site and is subsequently converted to the water by capturing four electrons and reacting with four protons. Few catalyst metals were found to have a comparable catalytic efficiency as that of platinum for the ORR. Furthermore, the electrodes in the electrochemical devices such as fuel cells often operate in an acidic environment. Non-noble metals in their metallic state generally can not tolerate and sustain such corrosive condition without being dissolved into a soluble, ionic form.

It has been known that the molecules containing macrocyclic structure with an iron or cobalt ion coordinated by nitrogen from the four surrounding pyrrolyl rings have catalytic activity to capture and to reduce molecular oxygen as disclosed in R. Jasinski, Nature 201, incorporated herein by reference. It was later demonstrated that ORR catalytic activity can be further improved for such systems containing coordinated functional group $FeN_4$ and $CoN_4$ macrocycles if they have been heat-treated as disclosed in J. A. R. van Veen, et al. Electrochim. Acta 48, incorporated herein by reference. Examples of macro-molecular system containing $FeN_4$ and $CoN_4$ moieties include corresponding transitional metal phthalocyanine, porphyrin, etc. Recent experiments by Dodelet and coworkers, disclosed in M. Lefevre et al. Electrochim Acta 48 and G. Faubert et al. Electrochim. Acta 43, incorporated herein by reference, showed a similar method of making amorphous carbon based catalyst with good ORR activity by mixing macromolecules with $FeN_4$ groups and carbonaceous material or synthetic carbon support, followed by high temperature treatment in a gas mixture of ammonia, hydrogen and argon. They found that at high temperature, iron salt adsorbed on the carbon in the presence nitrogen precursor to produce a catalyst with ORR activity. They attributed the catalytic activity to the active site with a phenanthroline type structure where Fe ion is coordinated to two pyridinic nitrogens. They also found that the catalyst thus produced will decompose in an acidic condition to release iron, thus is unstable for the electro-catalytic reaction such as that inside of a fuel cell cathode.

We describe a new method of producing aligned carbon nanotube catalyst layers containing transitional metals such as Fe and Co which have unique geometric shape and stable ORR activity in the acidic environment.

Organometallic compounds containing Fe or Co, including but not limited to ferrocene, iron phthalocyanine, iron porphyrin, iron pentacarbonyl, bis(cyclopentadienyl)cobalt, cobalt porphyrin, dicobalt octacarbonyl etc., are mixed with other organic compounds, including but not limited to xylene, toluene, benzene, pyridine, etc., either in liquid or in gas phase before being injected into the first zone of the CVD reactor. Other organometallic compounds with similar molecular structure but containing Ni and Cr may also be used. In addition, other hydrocarbons such as acetylene, ethylene, hexane, acetonitrile, etc., can also be used. The vaporized mixture is carried by the carrier gases such as hydrogen and argon and optionally ammonia and is carbonized over the substrate in the second zone. The ACNTs thus formed have transition metal atomically distributed throughout the graphitic substrate, which has the electro-catalytic activity towards ORR and is stable in an acidic environment such as present in a fuel cell.

This is achieved through a chemical vapor deposition method consisting of the following steps: a) transitional metal organometallic compounds with or without the coordination of pyrrolyl nitrogen are dissolved into the liquid hydrocarbon or mixed with gas phase hydrocarbon precursors before being injected into the first reactor zone (zone I) which is heated to a designated temperature; b) the mixture is vaporized in Zone I and is carried into the second reactor zone (Zone II) by the carrier gas of $H_2$/Ar. The carrier gas may or may not include $NH_3$; c) metal organic compound/hydrocarbon mixture decomposes on the surface of substrate plate in Zone II and forms aligned carbon nanotubes which grow perpendicular to the substrate plane; d) an alternative to step a) is to place the solid form of the metal organometallic compounds in Zone I followed by raising its temperature to a designated value. The vapor from solid sublimation is transported downstream to Zone II by the carrier gas and is decomposed on the substrate to form ACNT as described in step c.

The present invention is superior to the prior art in several aspects. First of all, the carbon made up ACNT has a graphitic phase which is different from the amorphous type produced in the prior art. By mixing transition metal organometallic compounds with hydrocarbons in liquid or in gas phase in a CVD process, a much more uniform reaction mixture is produced compared to the solid mixing method used in the prior art. This uniform mixture deposits and decomposes continuously on the substrate during the carbon nanotube growth, thus allowing a more homogenous distribution of the transition metal throughout the graphitic plane in ACNT. Second, the metal to carbon ratio is limited only by the solubility of the organometallics in the hydrocarbon for a solution-type mixture. This limit can be further enhanced for a vapor phase mixture. Such flexibility leads to very high metal-to-carbon ratio thus high density of the catalytic site. For example, an atomic ratio of Fe-to-C as high as 1:20 has been observed according to the present invention.

This is in contrary to the solid mixing method of the prior art where the absorption of organometallic compounds to the carbon support is often very limited and inhomogeneous. Therefore, the metal loading in ACNT can be significantly enhanced yet at the same time an even distribution of metal can be achieved according to this invention. Third, mixing $NH_3$ with the organometallics/hydrocarbon in a homogenous vapor makes it easier to incorporate nitrogen molecularly into the graphitic plane to form $MN_2$ or $MN_4$ (M=Fe, Co, etc.) moieties during a gas-to-solid transition in a chemical vapor deposition process. The functional groups with $MN_2$ or $MN_4$ coordination structure are apparently the active site for ORR. Fourth, ACNT formed according to current invention have a graphitic structure with $MN_2$ or $MN_4$ groups embedded into the graphic plane. Graphite is more stable in the oxidizing and acidic environment as found inside of a fuel cell than that of amorphous carbon. Therefore, the current invention provides a material with better electro-catalytic stability. Fifth, ACNTs fabricated according to the current invention have better electric conductivity than that of mixed amorphous carbon support of the prior art since graphitic carbon nanotubes are a better electric conducting material. The direct contact of the perpendicular alignment of the nanotubes with the fuel cell current collector allows a more effective charge transfer from the electrodes, and reduces the internal resistance of a PEMFC, improving the overall fuel cell efficiency. Sixth, unlike amorphous carbon, the graphitic ACNTs have high hydrophobicity and effectively repel water formed on an electrode surface, improving the humidity management on the PEMFC cathode. Seventh, the ACNT bundles can be patterned into a three-dimensional design similar to that of flow field in a bipolar plate, improving the reactant gas distribution and the electric conductivity.

The process of preparing ACNT with electro-catalytic activity for oxygen reduction reaction includes the following stages:

Stage I—Preparing substrate for ACNT growth. The substrate used for ACNT growth can be made of refractory materials stable at elevated temperature such as quartz, silica, silicon, etc. Metals and alloys with high temperature stability such as nickel, stainless steel, etc. can also be used. In a preferred embodiment of the invention, the substrate is made of quartz plates and is tolerant to temperatures up to 1000. The preparation includes a cleaning step by immersing the quartz plate into a hot liquid bath containing a mixture of concentrated sulfuric acid (98%) and hydrogen peroxide solution (30%) at temperature below 100. After being removed from the liquid bath and rinsed with deionized water, the quartz substrate plate is further cleaned in an acetone ultrasonic bath for 30 to 60 minutes, and then dried at room temperature. In an alternative embodiment of the invention, the substrate can be pre-engraved with the dimensional patterns such as those suitable for an electro-chemical application. For example, a flow field pattern for gas distribution in fuel cell can be formed through various photolithographic methods followed by an acid etching if a quartz substrate is used to grow ACNT.

Stage II—Preparing an organometallics and hydrocarbon mixture as precursor for ACNT growth. The organometallic compounds used in the current invention contain transition metals and preferably Fe or Co. The organometallic compounds can be solid, liquid or gaseous at room temperature. For compounds in liquid or solid phases, they have relatively low boiling or sublimation points and can be easily vaporized in the Zone I of the reactor, see FIG. 1, preferably with boiling or partial sublimation points less than about 700° C. All the Organometallic compounds can be thermally decomposed at high temperature less than about 1000° C. in reactor Zone II. The transition metal in these compounds may either be coordinated by the nitrogens from the pyrrolyl functional group such as iron phthalocyanine (FePc), or the other materials of Table 1. Other compounds such as transition metal carbonyl and transition metal acetylactonate may also be used. The organometallic compounds can either be used directly, or mixed with other hydrocarbons and N-containing hydrocarbons as the additive for ACNT growth. The hydrocarbons/N-containing hydrocarbons that can be used as the precursor additives include aromatics, nitrogen-containing aromatics, olefins, and compounds with unsaturated carbon-nitrogen bonds. Examples include xylene, toluene, benzene, acetylene, ethylene, pyridine, acetonitrile, and others.

In one embodiment, the organometallic compounds can be used directly by injecting or placing same in reactor Zone I without mixing with hydrocarbon additives. In another embodiment, the organometallic compounds can be dissolved into liquid hydrocarbons or nitrogen-containing hydrocarbons to form a mixture before being injected into Zone I of the CVD reactor. In yet another embodiment of the invention, the organometallic compounds can be injected or placed in reactor Zone I while the hydrocarbon additives are added separately from another inlet to the reactor zone. This is particularly the case when the organometallic compounds are in different phases and cannot be dissolved in the hydrocarbons at ambient temperature. In preparing the organometallics and hydrocarbon liquid mixture, the upper limit of the amount of organometallic compound in the mixture is determined by its solubility in the specific hydrocarbon used and the temperature and/or pressure in reactor zone 1. In general, the amount of organometallic compound in the mixture in terms of transitional metal weight loading ranges from 0.1 wt. % to 5 wt. %. In the preferred embodiment, the transitional metal weight loading ranges from 0.2 wt. % to 4 wt. %.

Stage III—The aligned carbon nanotubes with ORR activity according to the current invention are prepared through chemical vapor deposition (CVD). The schematic of the CVD reactor is shown in FIG. 1. The reactor is divided by two portions, Zone I and Zone II, with the temperatures being controlled independently in each zone by mechanism (not shown) known in the art. A reactor tube is made with a material stable at elevated temperature such as quartz. In one embodiment of the invention, the precursor of the organometallic compound with or without a hydrocarbon solvent is injected into the Zone I through an injector and is subsequently vaporized to the gas phase. Simultaneously a carrying gas mixture containing $H_2$, Ar and optionally $NH_3$ is fed through an upstream inlet to mix and carry the precursor vapor to Zone II of the reactor. The Zone I temperature depends on the type of organometallic compound and the hydrocarbon additives. For example, when a ferrocene/xylene mixture is used, Zone I temperature is maintained at 225° C. However, when FePc/pyridine is used, the Zone I temperature is maintained at 300° C. Typically the injection rate ranges from 0.02 ml/min to 0.5 ml/min for a quartz reactor with one inch in diameter and Zone I temperature ranges from about 180° C. to about 450° C. The ratio of $H_2/Ar/NH_3$ ranges from about 1/3/0.75 to about 1/1.6/0.4. The ratio of $H_2/Ar$ is about ⅓ when ammonia is absent. In another embodiment of the invention, the organometallic compound is placed at the center of Zone I before the temperature is ramped up to the designated vaporization or sublimation point. The vapor thus produced is carried downstream to Zone II by the gas mixture containing $H_2$, Ar and optionally $NH_3$. For example, FePc which is solid at ambient temperatures, is placed at the center of the Zone I before the temperature is raised to 650° C. with the ramp rate about 10° C./min. Again the Zone I temperature depends on the sublimation point of the precursor and typically ranges from about 450° C. to about 700° C. The composition of the carrier gas in the invention also depends on the precursor applied.

The formation of ACNT through the precursor vapor decomposition in the presence of a carrier gas occurs in Zone II of the reactor. A substrate plate prepared according to stage I is placed at the center of Zone II over which the ACNT grows. In a preferred embodiment of the invention, a polished quartz plate is placed at center of Zone II. The temperature of Zone II depends again on the type of precursor used. For example, when ferrocene/xylene mixture is used, the Zone II temperature is maintained in the range of from about 700° C. to about 800° C. However, when FePc/pyridine is used, the Zone II temperature is raised to between about 800° C. to about 1000° C. In general, the Zone II temperature ranges from about 700° C. to about 1000° C. The shape, the diameter and the length of the ACNT depends on the combination of the precursor, the carrier gas, the temperature as well as the carbonization time. The shape of the nanotube is generally a function of the chemical mixture used in the CVD process. For example, introducing pyridine in the mixture can lead to spiral growth of the tube while FePc as precursor generally produces bamboo-like structure. Ferrocene/xylene system produce bellows shaped tube with hollow centers. The nanotube length depends on the growth temperature and the time. Generally higher temperature and longer growth time lead to longer nanotube. The diameter of the nanotube is sensitive to the nature of the substrate, temperature, pressure, etc. For example, silica based substrates usually lead to a smaller tube diameter than that of a silicon substrate under the same CVD conditions.

For most of the samples described in this invention, the carbonization time ranges from about 10 to about 45 minutes.

The process of preparing ACNT with electro-catalytic activity for an oxygen reduction reaction can be further elucidated by the following examples:

Example 1

A thin quartz plate with dimension of ⅝"×1.5"×0.1" was cleaned in a solution containing 70 vol. % concentrated $H_2SO_4$ and 30 vol. % $H_2O_2$. The solution temperature was maintained between 70° to 100° C. After cleaning and rising with deionized water, it was ultrasonically cleaned in acetone for 30 min. The dried quartz plate was ready for the use as the substrate.

Example 2

Figure 2:
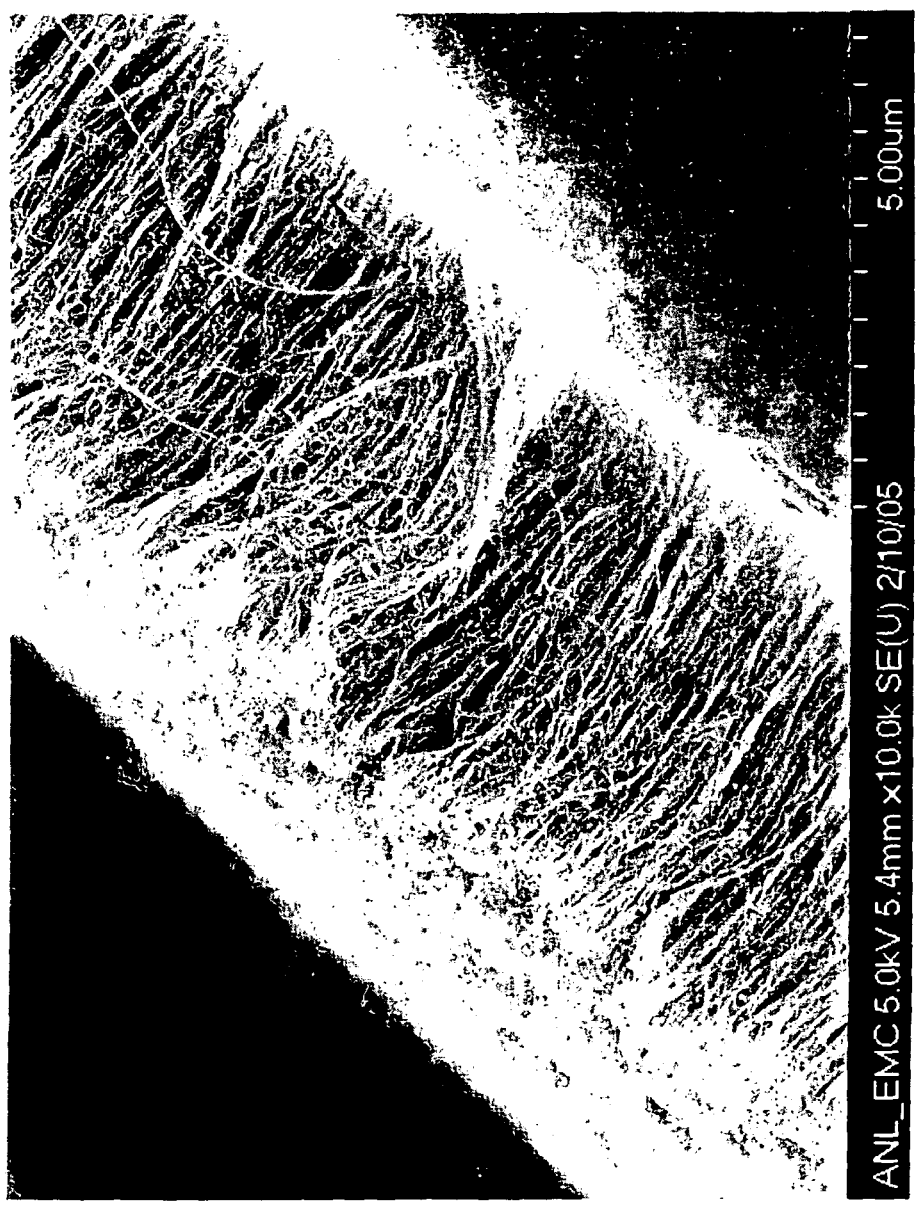
FIG. 2 is a SEM image of ACNT bundles as grown according to the present invention.

A precursor was prepared by dissolving one gram of ferrocene (Sigma-Aldrich) into 10 ml xylene (Sigma-Aldrich). A chemical vapor deposition reactor was constructed consisting of a quartz tube (OD=1.5 inch) inserted through two heating zones, Zone I and Zone II, with length of 8" and 12", respectively. The temperature of Zone I and Zone II were adjusted to 225° C. and 725° C., respectively. The precursor was injected into the Zone I at 0.032 ml/min with a syringe pump (kd Scientific). Simultaneously, a carrier gas mixture containing ammonia, hydrogen and argon with volume ratio $H_2/Ar/NH_3=1/3/0.75$ and total flow rate of 190 ml/min was added upstream of Zone I. Inside of Zone II a quartz plate prepared according to the Example I was placed. The carbonization process occurred over the substrate for 30 minutes until the liquid precursor injection stopped. The carrier gas continued to flow for another 20 minutes before the reactor was cooled down. An image of ACNTs produced during the carbonization process was taken by a high resolution scanning electron microscope (SEM) and is shown in FIG. 2.

Example 3

Figure 3:
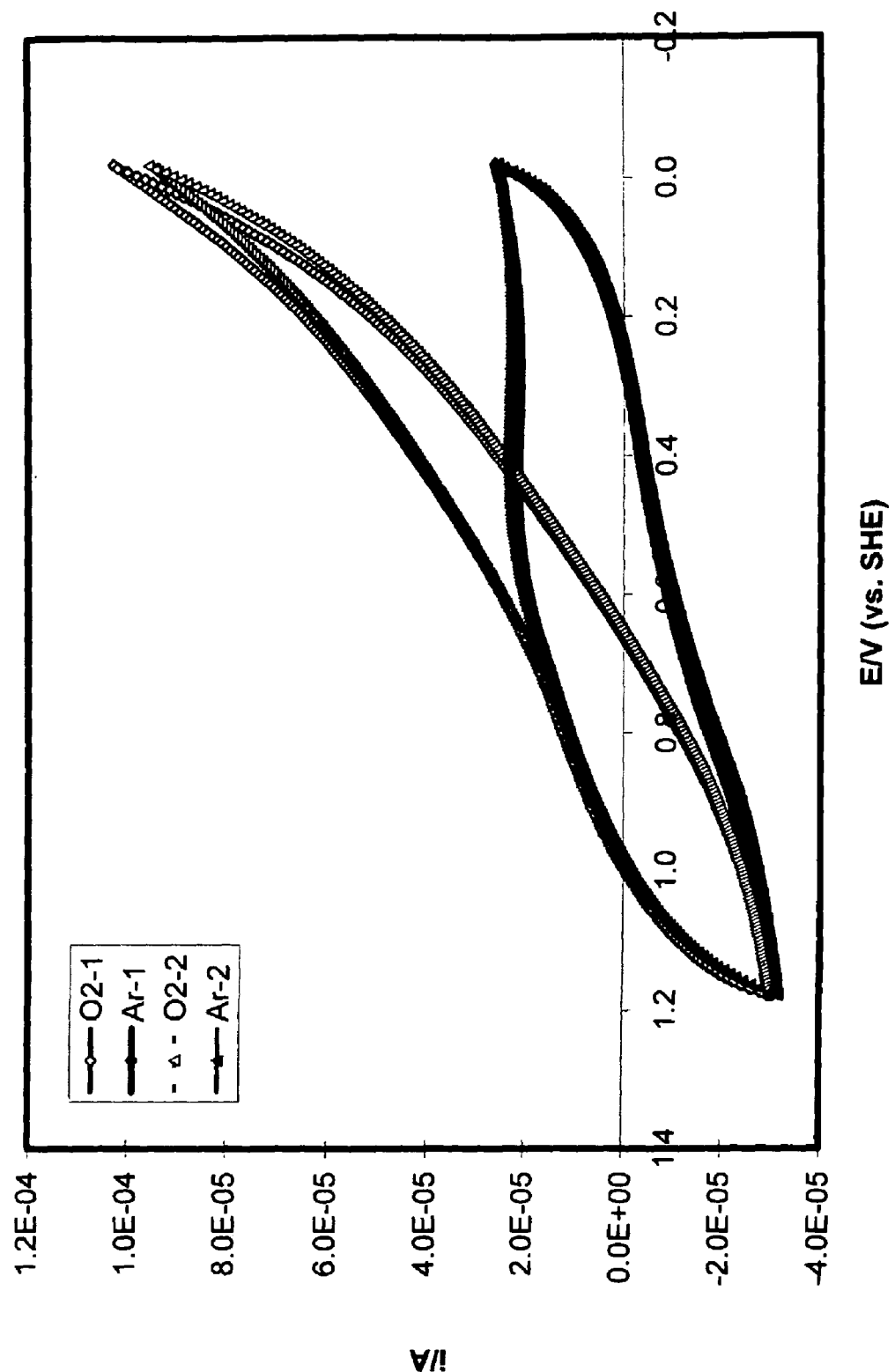
FIGS. 3-5 are graphical representations of cyclic voltammograms for ACNTs grown under different conditions and tested according to Examples 3, 5 and 7, respectively.

To evaluate the activity of the $O_2$ reduction reaction (ORR) at an electrode (cathode) of ACNTs, nano-carbon tubes electrodes, cyclic voltammograms (CVs) of the electrodes in the absence and presence of $O_2$ were measured in the 0.6 M $HClO_4$ aqueous electrolyte at various scan rates (10~100 mV/s). The reference electrode used was $Hg/Hg_2SO_4$ and the counter electrode was an Au coil separated from the other electrodes. The ACNT sample prepared according to the procedure in Example 2 was transferred to a double-sided conductive tape which was made of acrylic adhesive and carbon black (Structure Probe, Inc.) After the transfer, the orientation of the carbon nanotube remained intact. The total transfer area was ⅝"×5/16". Shown in FIG. 3 are the CVs measured under various experimental conditions with the electrolyte saturated with oxygen ($O_2$-1 or $O_2$-2) or purged by argon (Ar-1 or Ar-2) so that it was $O_2$ free. The potential at which the ORR occurred was determined by the voltage where the electrode current differentiated when $O_2$ was present or absent in the electrolyte. For control, blank CVs of the conductive tape used to support the aligned nano-tubes were also measured. We found that ORR potential for this ACNT started at 0.78 volt, as is shown by the difference between plots labeled as $O_2$-1 and Ar-1. To investigate the electro-catalyst stability under the acidic condition, we also evaluated the oxygen reduction current after the electrode was immersed in the acid electrolyte (pH=1) overnight, as is shown by the second CV ($O_2$-2) in FIG. 3. We found that CVs before and after the acid treatment essentially overlapped with each other, suggesting an excellent acid tolerance for the ACNT sample studied.

Example 4

Another batch of ACNT was produced using the identical experimental method as that described in Example 2 except that $NH_3$ was removed from the carrier gas. The sample was also transferred to the conductive tape in the same manner and dimension as that described in Example 3. The sample was also tested by the cyclic voltamic method described in Example 3. Lower ORR current was observed under the same voltage, suggesting that there was lesser amount of catalyst active centers when the ACNT was fabricated in the absence of ammonia.

Example 5

Figure 4:
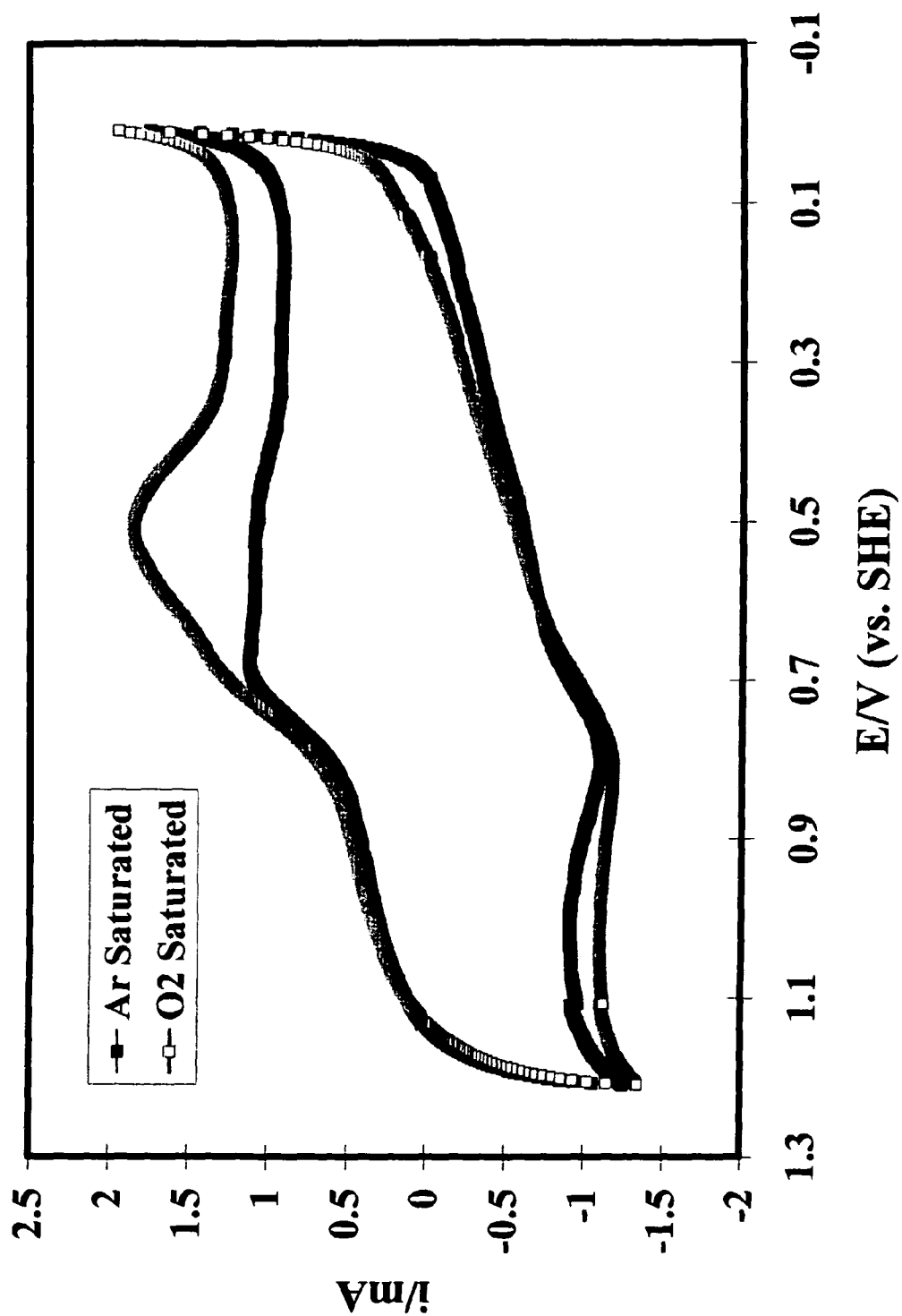

An alternative method to evaluate ORR activity of the ACNT sample prepared according to the procedure in Example 2, the ACNT layer was removed from the substrate and mixed with 10 portions of Nafionionomer solution (Aldrich) by weight to form an ink. The ink was subsequently applied and dried evenly over a graphite foil used as a working electrode. The electrode was submerged 0.6 M $HClO_4$ aqueous electrolyte solution and the cyclic voltammograms were obtained when the solution was purged with $O_2$ or Ar. The reference electrode used was Ag/AgCl (3M NaCl) and the counter electrode was a Pt mesh. Shown in FIG. 4 are the CVs measured under the experimental condition with the electrolyte saturated with oxygen or purged by argon so that it was $O_2$ free. The ORR potential was determined by the voltage where the electrode current differentiated when $O_2$ was present or absent in the electrolyte. We found that ORR potential for the ACNT ink started at 0.74 volt which was consistent with the taped ACNT measurement in Example 3.

Example 6

An ACNT sample was prepared using the same CVD reactor described in Example 1. FePc solid (0.0745 gram) was used as precursor. It was placed at the center of the Zone 1 before its temperature was ramped up to 680° C. During the initial temperature ramp, the carrier gas consisted of only hydrogen and argon with $H_2/Ar=0.83$ and a total flow rate of 330 ml/min. Once the temperature reached 650° C., ammonia was added into the carrier gas and its composition was changed to $H_2/Ar/NH_3=1/1.6/0.4$ with a total flow rate of 300 ml/min. The temperature of Zone II was adjusted to 850° C. and the growth of ACNT over the quartz substrate was observed. After 25 minutes of deposition/carbonization, the hydrogen was removed from the carrier gas and the reaction continued for another 10 minutes. The ACNT sample thus produced also was studied by the cyclic voltammetry method as described in Example 3. A repeatable voltammogram was observed for the ORR reaction even after the sample was treated in acidic condition after 12 hours. For comparison, an ACNT sample was prepared according to the same procedure except that no $NH_3$ was added into the carrier gas mixture. The sample was also tested by the same cyclic voltammetry condition. The ORR activity was found to decrease significantly after 12 hour treatment in the acidic solution (pH=1), suggesting that ammonia improved the catalyst stability of ACNTs during CVD process when in an acid environment.

Example 7

Figure 5:
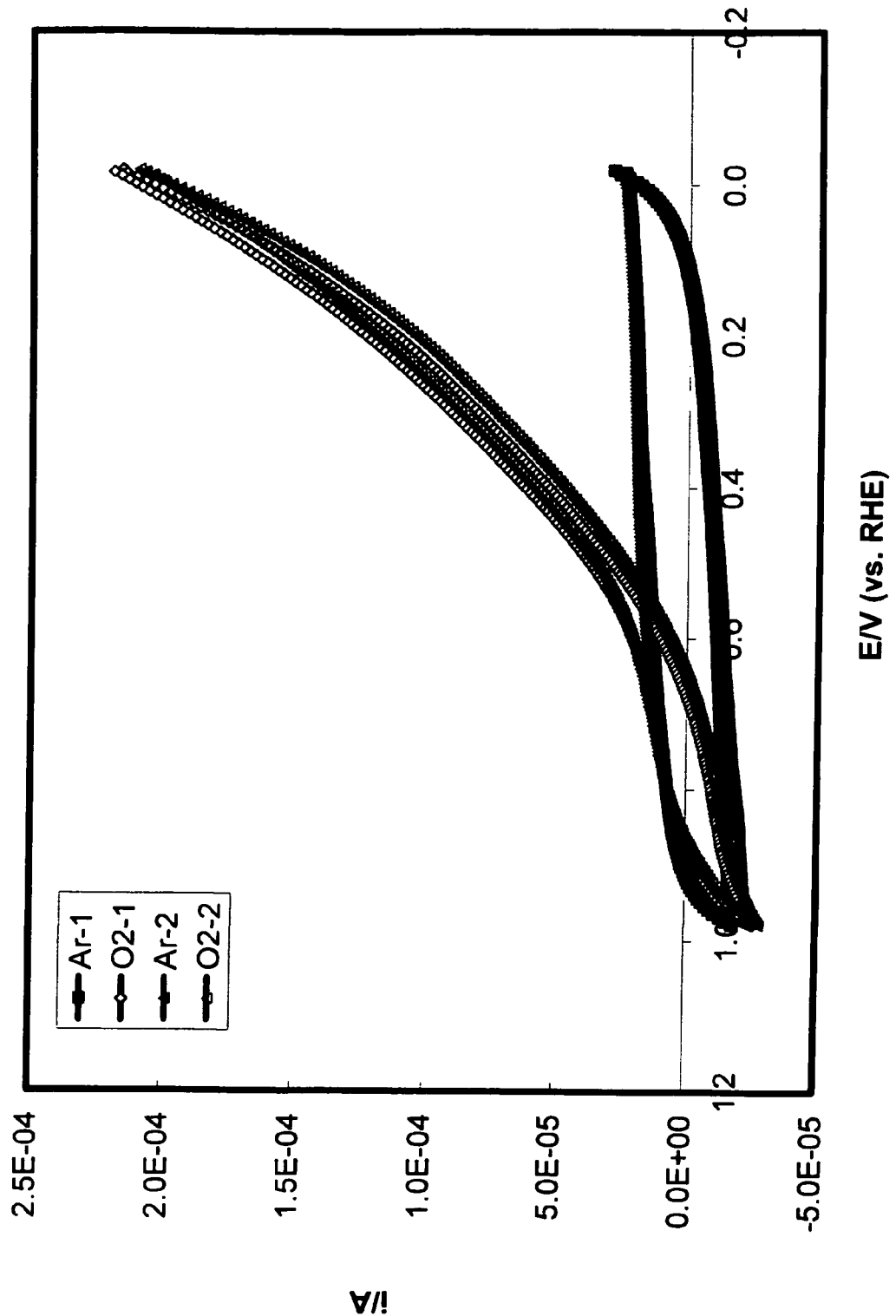
Figure 6:
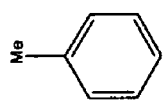
FIG. 6 is a schematic flow diagram showing the chemical reactions necessary to produce aligned carbon nanotubes with ORR activity of the present invention and includes an illustration of the carbon nanotube per se.
Figure 6:
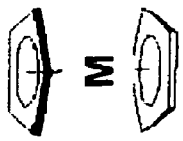
Figure 6:
Figure 6:
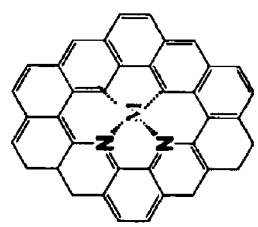
Figure 6:
Figure 6:
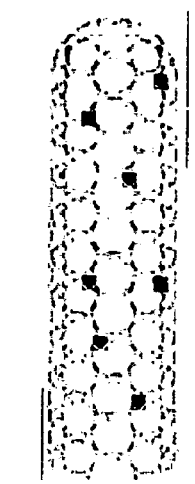
Figure 7:
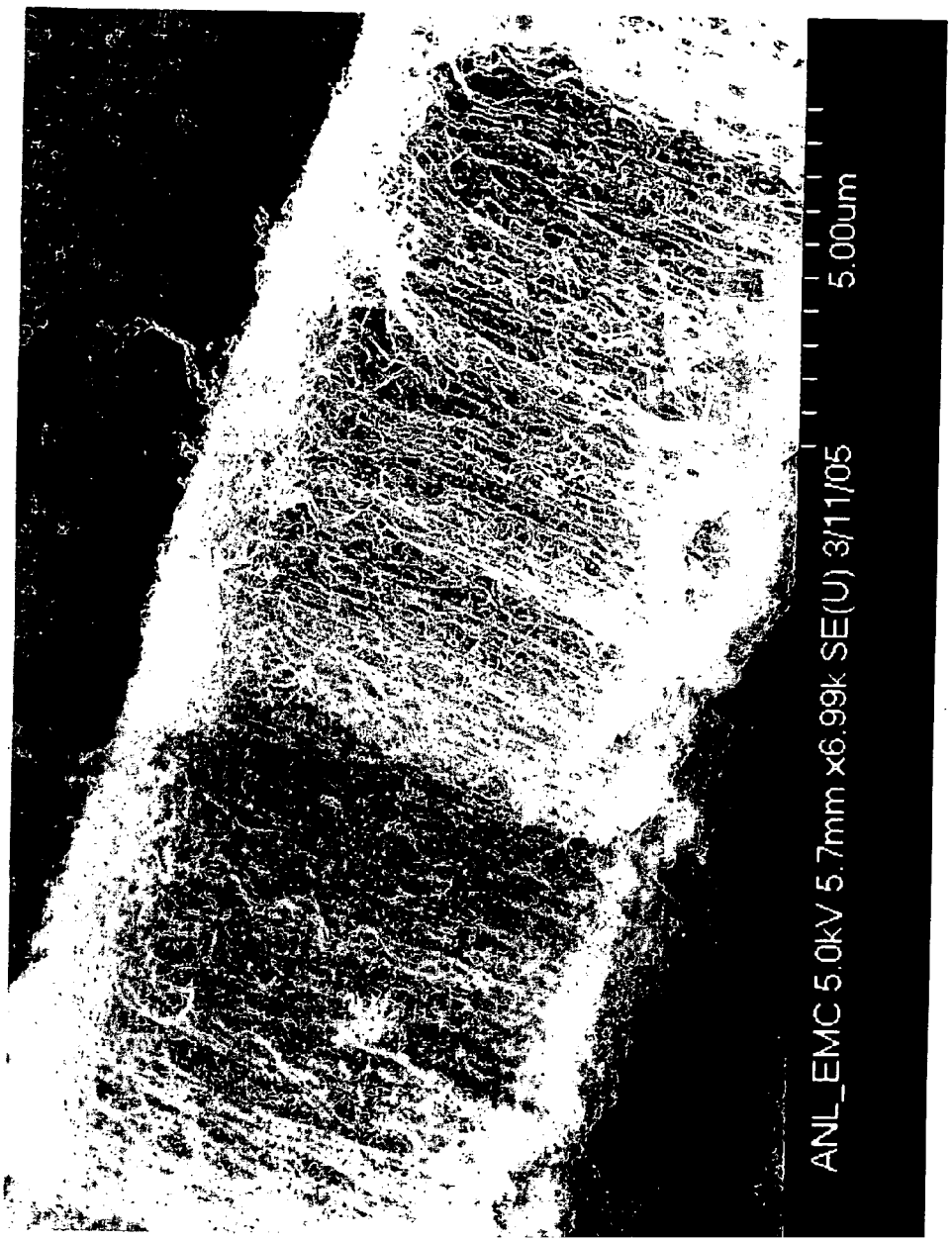
FIG. 7 is a SEM image of aligned carbon nanotubes wherein a portion of the nanotubes is spiral in shape.
Figure 8:
FIG. 8 is a SEM image of aligned carbon nanotubes wherein the carbon nanotubes are provided with bamboo-like or bellows-like shapes.

An ACNT sample was prepared using the same CVD reactor described in Example 1. FePc solid (0.0988 g) was dissolved in 5 ml pyridine and was fed continuously into Zone I with a syringe pump at a feeding rate of 0.096 ml/min. The zone I temperature was maintained at 300° C. At this temperature, the liquid exiting the capillary was immediately volatilized and carried by the flow of Ar (150 ml/min) and $H_2$ (150 ml/min) into Zone II of the quartz tube, where the pyrolysis was performed at 850° C. The ACNT layer was grown on the surface of polished quartz for 15 min. The resulting ACNT layer was subsequently transferred and tested by cyclovoltammogram according to the procedure described in Example 3. Shown in FIG. 5 are the CVs measured under various experimental conditions with the electrolyte saturated with oxygen ($O_2$-1 or $O_2$-2) or purged by argon (Ar-1 or Ar-2). The ORR potential for this ACNT started at 0.8 volt, as is shown by the difference between plots labeled as $O_2$-1 and Ar-1. The performances remained nearly the same after overnight treatment in an acid electrolyte (pH=1), as is shown by the plots of $O_2$-2 and Ar-2.

Example 8

An ACNT sample was prepared using the same CVD reactor described in Example 1. Ferrocene solid (0.7694 g) was dissolved in 15 ml pyridine and was fed continuously into Zone I with the syringe pump at a feeding rate of 0.096 ml/min. Zone I temperature was maintained at 200° C. At this temperature, the liquid exiting the capillary was immediately volatilized and carried by the flow of Ar (50 ml/min) and $H_2$ (50 ml/min) into Zone II of the quartz tube, where the pyrolysis was performed at 725° C. The ACNT layer was grown on the surface of polished quartz for 30 min. The resulting ACNT layer was subsequently removed and mixed with Nafion ionomer solution to form an ink. The ink was subsequently applied and dried evenly over a graphite foil used as a working electrode. The electrode was submerged into 0.6 M $HClO_4$ aqueous electrolyte solution and the cyclic voltammograms were obtained when the solution was purged with $O_2$ or Ar. The reference electrode used was Ag/AgCl (3M NaCl) and the counter electrode was a Pt mesh. The potential at which the ORR occurred was determined by the voltage where the electrode current differentiated when $O_2$ was present or absent in the electrolyte. We found that ORR potential for this ACNT ink started at 0.76 volt.

Figure 9:
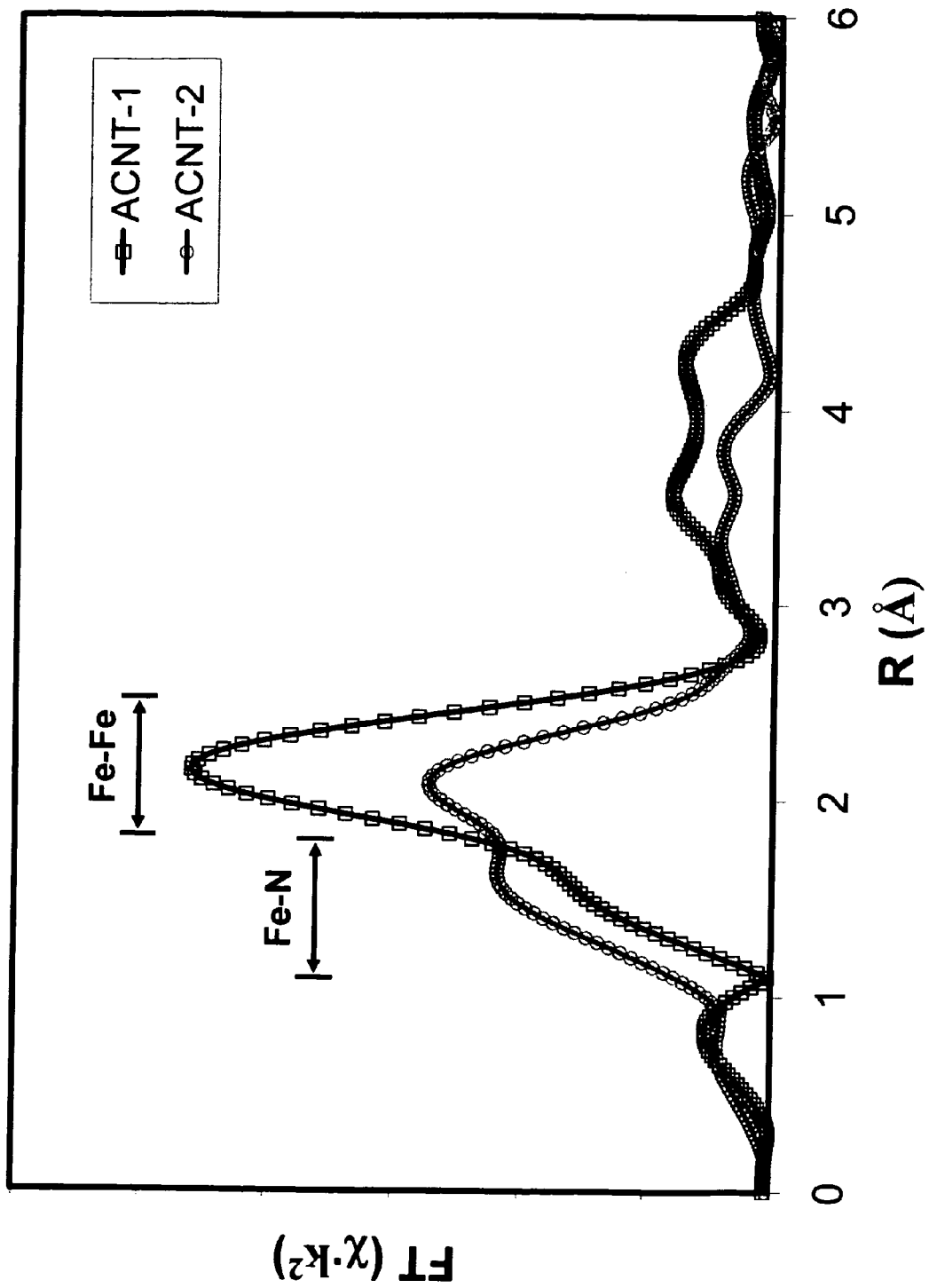
FIG. 9 is a graphical representation of the radial distribution functions of ACNTs prepared from ferrocen/xylene without (ACNT-1) and with (ACNT-2) ammonia.

In an attempt to better understand the active site for ORR, we conducted an X-ray absorption spectroscopic study (EXAMS and XANES) at the Fe K-edge for the carbon nanotube samples prepared using ferrocene/xylene mixture and the carrier gas without (ACNT-1) and with (ACNT-2) ammonia. Cyclic voltammogram studies have shown that ACNT-2 is significantly more active towards ORR reaction than ACNT-1. Shown in FIG. 9 are the radial distribution functions (RDFs) for ACNT-1 and ACNT-2 obtained through Fourier transformation of EXAMS spectra. From the reference compounds, the peak at 2.08 Å is identified as an Fe—Fe shell while that at 1.5 Å is attributed to a Fe—N shell (phase uncorrected). The RDF of ACNT-1 shows a dominating Fe—Fe interaction with a possibly weak Fe—C bond, while in ACNT-2 the interaction of Fe—N becomes very significant at the expense of lower Fe—Fe coordination. Clearly, adding $NH_3$ in the ACNT-2 synthesis resulted in significant increase of nitrogen coordination with Fe and reduced the formation of metallic iron crystallites. Correlating the results from EXAMS with that of cyclic voltammogram indicates that active site for ORR indeed involves the interaction between Fe and nitrogen, possibly in the form of —$FeN_2$. This is in agreement with Dodelet and coworkers claim that an active site has a phenanthroline type structure where transition metal is coordinated to two pyridinic nitrogen. In the case of ACNT-1, iron is mainly in the form of metallic particles, which are not effective as an ORR catalyst site.

Figure 10:
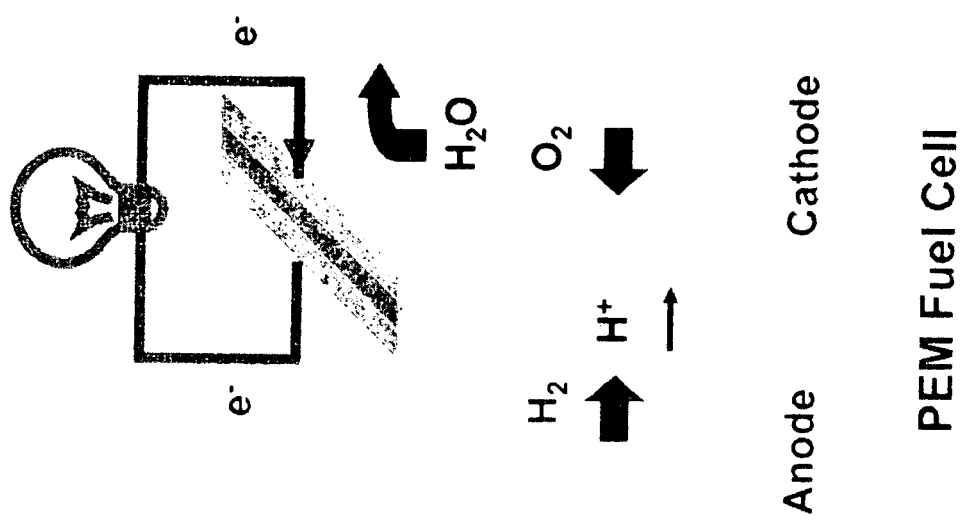
FIG. 10 is a schematic representation of a proton exchange membrane (PEM) fuel cell (PEMFC).

Referring now to FIG. 10, there is illustrated a representation of a traditional photon exchange fuel cell or PEFC which includes an anode and a cathode as labeled with a suitable hydrogen ion permeable membrane therebetween. Suitable hydrogen permeable membranes have been widely reported in the art such as those and referenced to a variety of patents by U. Balachandran, the disclosures of which are herein incorporated by reference, give more detail as to the representative materials which may be used in a PEMFC.

As seen therefore, there has been provided methods of making bundles of longitudinally aligned graphitic nanotubes having catalytically active transition metal incorporated longitudinally thereof. The nanotubes may be straight or spiral or bamboo in shape and may be open at one or both ends. Nitrogen atoms preferably are chemically bonded to some of the transition metals to provide catalytic activity in the acid environments of a PEMFC.

The embodiments of the invention in which an exclusive property or privilege is claimed are defined as follows:

1. A catalyst for an electro-chemical oxygen reduction reaction (ORR), comprising a bundle of longitudinally aligned graphitic carbon nanotubes having a catalytically active transition metal incorporated longitudinally and atomically distributed throughout the graphitic carbon walls of said nanotubes, wherein the nanotubes also include nitrogen atoms and/or ions chemically bonded to the graphitic carbon and to the transition metal.

2. The catalyst of claim 1, wherein said transition metal is one or more of Fe, Co, Ni, Mn, Cr and mixtures thereof.

3. The catalyst of claim 2, wherein said transition metal is Fe, Co, Ni or a mixture thereof.

4. The catalyst of claim 2, and further including a catalytic precious metal mixed with said transition metal.

5. The catalyst of claim 1, wherein most of said carbon nanotubes are open at least at one end thereof.

6. The catalyst of claim 1, wherein most of said carbon nanotubes are open at both ends thereof.

7. The catalyst of claim 1, wherein said carbon nanotubes are straight or spiral in shape having average diameters in the range of from about 10 to about 100 nanometers (nm) and average lengths in the range of from about 0.5 to about 50 microns.

8. The catalyst of claim 1, wherein most of said nanotubes are bamboo shaped.

9. The catalyst of claim 1 produced by chemical vapor deposition at a temperature in the range of about 700 to about 1000° C. from a gaseous mixture comprising an organometallic compound containing the transition metal, a nitrogen-containing compound, an inert gas, and a reducing gas.

10. A catalyst for an electro-chemical oxygen reduction reaction (ORR), comprising a bundle of longitudinally aligned graphitic carbon nanotubes including nitrogen atoms and/or ions bonded to carbon atoms in the nanotubes, the nanotubes having a catalytically active transition metal selected from Fe, Co, Ni, and mixtures thereof atomically distributed throughout the graphitic carbon of the nanotubes, the transition metal being chemically associated with the nitrogen atoms and/or ions.

11. The catalyst of claim 10, wherein most of said nanotubes are open at one end thereof and connected to a substrate at the other end thereof.

12. The catalyst of claim 11, wherein most of said nanotubes are straight or spiral or bamboo or bellows shaped.

13. The catalyst of claim 11, wherein said substrate is or contains Si or an oxide thereof or a transition metal.

14. The catalyst of claim 11, wherein said nanotubes are configured in a predetermined pattern on said substrate.

15. The catalyst of claim 10, wherein said nanotubes have average diameters in the range of from about 10 to about 100 nanometers (nm) and average lengths in the range of from about 0.5 to about 50 microns.

16. The catalyst of claim 10 produced by chemical vapor deposition at a temperature in the range of about 700 to about 1000° C. from a gaseous mixture comprising an organometallic compound containing the transition metal, a nitrogen-containing compound, an inert gas, and a reducing gas.

17. The catalyst of claim 16 wherein the nitrogen containing compound comprises ammonia, the inert gas comprises argon, and the reducing gas comprises hydrogen.

* * * * *